UNITED STATES PATENT OFFICE.

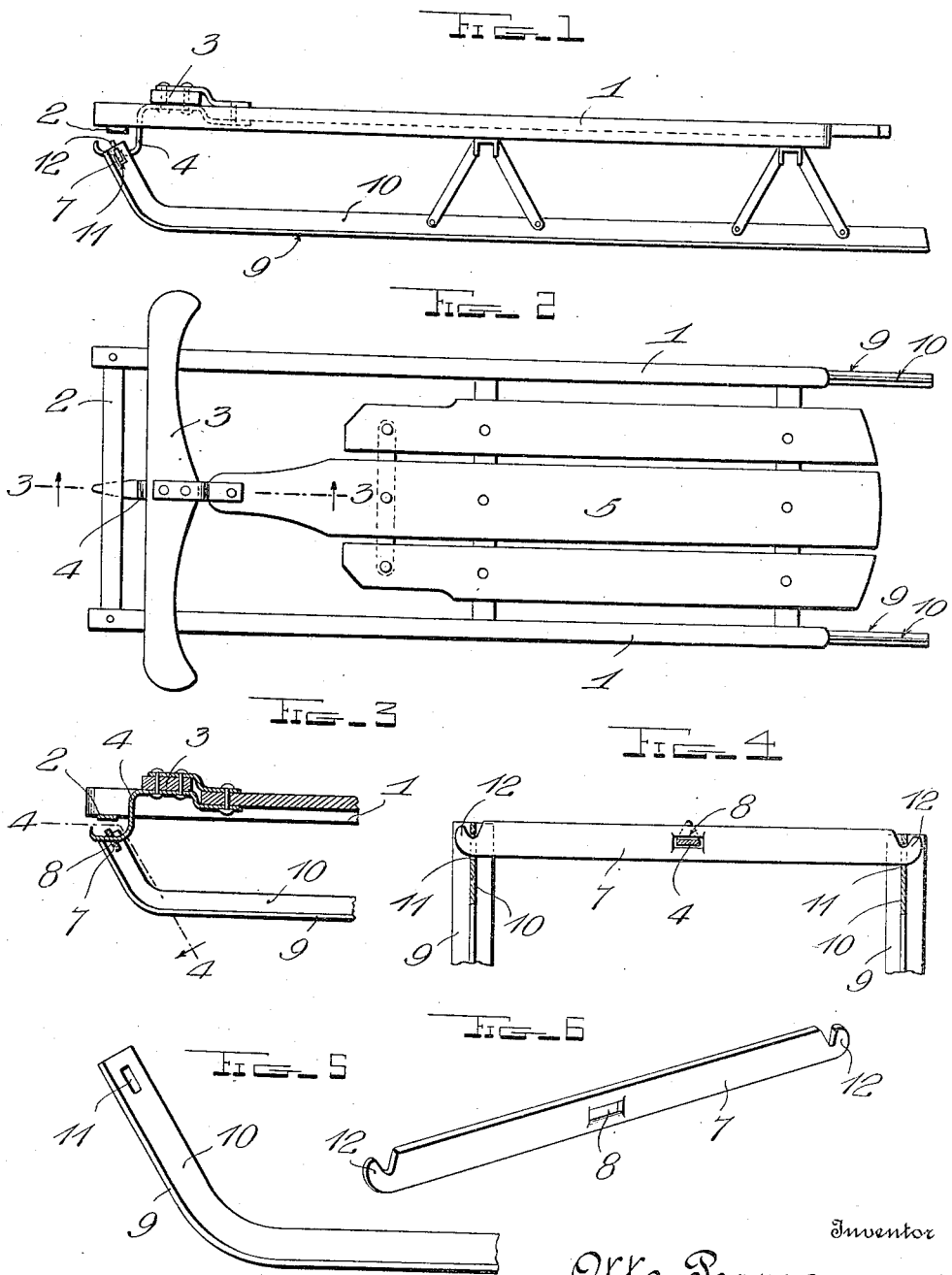

OTTO PEARSON, OF MOUNT JEWETT, PENNSYLVANIA.

MEANS FOR CONNECTING THE FRONT ENDS OF SLED-RUNNERS.

1,144,563.   Specification of Letters Patent.   Patented June 29, 1915.

Original application filed May 18, 1914, Serial No. 839,388. Divided and this application filed November 2, 1914. Serial No. 869,933.

*To all whom it may concern:*

Be it known that I, OTTO PEARSON, a subject of the King of Sweden, residing at Mount Jewett, in the county of McKean and State of Pennsylvania, have invented certain new and useful Improvements in Means for Connecting the Front Ends of Sled-Runners; and I do declare the following to be a full, clear, and exact description of the invention, such as will enable others skilled in the art to which it appertains to make and use the same.

This invention relates to improvements in sleds and more particularly to the means for connecting the front ends of the runners to the runner connecting bar.

The object of the invention is to provide simple and efficient means of this character which will reliably connect the front ends of sled runners without weakening them, thereby avoiding all dangers of their breakage when under severe strain.

Another object is to provide means for connecting the front end of sled runners with the cross bar whereby the bar is absolutely prevented from turning or working loose.

With these and other objects in view, the invention resides in certain novel features of construction and combination herein described and claimed and shown in the drawings.

In the accompanying drawings:—Figure 1 represents a side elevation of a sled equipped with this improvement; Fig. 2 is a plan view thereof; Fig. 3 is a vertical longitudinal section taken on the line 3—3 of Fig. 2; Fig. 4 is a detail transverse section on the line 4—4 of Fig. 3; Fig. 5 is a detail side elevation of the front end of one of the runners embodying this invention; Fig. 6 is a perspective view of the runner connecting bar detached.

In the embodiment illustrated, the side bars 1 are shown connected at their front ends by the usual cross bar 2. A handle bar 3 is mounted on the steering bar 4 which is pivotally connected at one end with the seat 5 of the sled and has its front end offset downwardly and extended laterally and then bent upwardly to form a hook-like engaging member for connecting the steering bar with the runner connecting cross bar 7. This cross bar 7 is provided intermediately of its ends preferably at a point midway thereof with the slot 8 to receive the hook 6 of the steering bar 4.

The runners 9 are shown constructed in the form of angle bars T-shaped in cross section, the webs 10 thereof at the front ends of the runners being slotted longitudinally as shown at 11 to receive hooks 12 formed on the ends of the metal cross bar 8 which when engaged securely connect the runners to the cross bar without any rivets being necessary, thereby forming a reliable and strong connection at these points, and they also serve to prevent the bar 7 from turning or working loose, which often occurs in devices of this character when the bar is riveted.

This invention adapts the connecting bar to be readily detached from the runners at will without removing any bolts or rivets, adapting the same to be readily assembled and disassembled.

I claim:

The combination with sled runners composed of angle-irons T shaped in cross section, the webs of which are provided near their front ends with longitudinally extending slots; of a cross bar having hooked ends for interlocking engagement with the slots in said runners, and means for connecting said cross bar with the steering bar.

In testimony whereof I have hereunto set my hand in presence of two subscribing witnesses.

OTTO PEARSON.

Witnesses:
SEXTUS LUNDBERG,
HAROLD K. LUNDBERG.

Copies of this patent may be obtained for five cents each, by addressing the "Commissioner of Patents, Washington, D. C."